United States Patent [19]

Willis

[11] 3,970,939
[45] July 20, 1976

[54] SIGNAL GENERATING AND TRANSMITTING APPARATUS

[75] Inventor: John G. Willis, Wakefield, Mass.

[73] Assignee: Solid State Technology, Inc., Wilmington, Mass.

[22] Filed: Oct. 22, 1974

[21] Appl. No.: 516,973

[52] U.S. Cl. .............................. 325/185; 290/1 E; 325/166; 340/333
[51] Int. Cl.² .......................................... H04B 1/04
[58] Field of Search .......... 325/185, 186, 119, 161, 325/169; 340/214, 410, 411, 333; 290/1 E

[56] References Cited
UNITED STATES PATENTS

| | | | |
|---|---|---|---|
| 2,773,977 | 12/1956 | Hale | 340/411 |
| 3,159,747 | 12/1964 | Jones | 340/411 |
| 3,621,398 | 11/1971 | Willis | 325/185 X |
| 3,633,106 | 1/1972 | Willis | 325/185 |
| 3,794,852 | 2/1974 | Willis | 325/185 |
| 3,818,467 | 6/1974 | Willis | 325/185 X |

*Primary Examiner*—Benedict V. Safourek
*Assistant Examiner*—Robert Hearn

[57] ABSTRACT

A self-contained alarm signal apparatus is disclosed which comprises an electrical signal generator, and encoder connected to receive the output of the generator and to encode a message to be delivered to a transmitter, a source of stored mechanical energy, and connector means for intermittently applying energy from the energy source to the generator for production of an electrical signal. Also provided are first and second input devices for delivering mechanical inputs to the connector means, each of the mechanical inputs operative to cause the connector means to apply energy to the generator. The first input device comprises manually actuable means and the second input device is automatically operable and comprises a timer and means to deliver a mechanical input to the connector means at predetermined time intervals.

13 Claims, 10 Drawing Figures

3,970,939

SIGNAL GENERATING AND TRANSMITTING APPARATUS

BACKGROUND OF THE INVENTION

This invention relates to improvements in self-contained signal generating and transmitting apparatus. A particular example of such apparatus is a radio operated fire alarm box suitable for generating and transmitting an alarm signal to be received by a central location.

For various reasons it is often desirable to have a municipal or other fire alarm system which employs radio operated call boxes rather than units which depend upon telephone or other lines to connect the remote boxes to a central receiving station. The actual design and construction of such units, however, has posed various problems which have resulted in a minimal acceptance of such units. Such problems include the requirement of frequent visits for replacement or recharging of batteries in battery-powered units; the inability to remotely and automatically determine the continuing operability of the unit when powered from stored energy other than a storage battery; the short life time of energy sources employed in self-contained units; etc.

SUMMARY OF THE INVENTION

In view of the foregoing, it is a principle object of the present invention to provide an improved self-contained signal transmitting apparatus which overcomes these various difficulties. It is a further object to provide such apparatus which incorporates a long-lived, reliable source of energy which is easily recharged when necessary.

To achieve these and other objects as shall further appear, a self-contained alarm signal apparatus according to the present invention comprises an electrical signal generator, an encoder connected to receive the output of the generator and to encode a message to be delivered to a transmitter, a source of stored mechanical energy, and connector means for intermittently applying energy from the energy source to the generator for the production of the electrical signal. Also provided are first and second input devices for delivering mechanical inputs to the connector means. Each of the mechanical inputs is operative to cause the connector means to briefly apply energy to the generator. The first input device comprises manually actuable means and the second input device is automatically operable and comprises a timer and means to deliver a mechanical input to the connector means at predetermined time intervals.

In preferred embodiments of the invention a third input device is provided and comprises sensing means for sensing the departure of the apparatus by predetermined amount from the predetermined orientation and means to deliver a mechanical input to the connector means upon the occurrence of such a departure. It is also preferred that the source of stored mechanical energy comprise a plurality of spring units connected to serially drive a common shaft with each spring unit comprising a first spool securable to that shaft, a second spool, and a coil spring secured at its opposite ends to those spools. It is also preferred that a second such source of stored mechanical energy be provided as part of the second input device, the source of energy driving the aforementioned timer.

Each source of stored mechanical energy may further comprise an interlock device associated with each pair of adjacent spring units, the device operative to permit only one unexhausted spring unit to be in driving relation with the shaft at any given time.

The connector means of the apparatus preferably comprise a rotary unit secured to the shaft of the energy source for rotation therewith and drivingly engaged with the generator; check means movable between first and second positions, those means in the first position preventing rotation of the rotary unit and in the second position permitting that rotation; and release means responsive to each of the mechanical inputs for moving the check means from the first position to the second position.

BRIEF DESCRIPTION OF THE DRAWINGS

Other objects, features, and advantages of the invention will appear from the following description of a particular preferred embodiment, taken together with the accompanying drawings in which.

DETAILED DESCRIPTION OF A PARTICULAR PREFERRED EMBODIMENT

General

Figure 1:
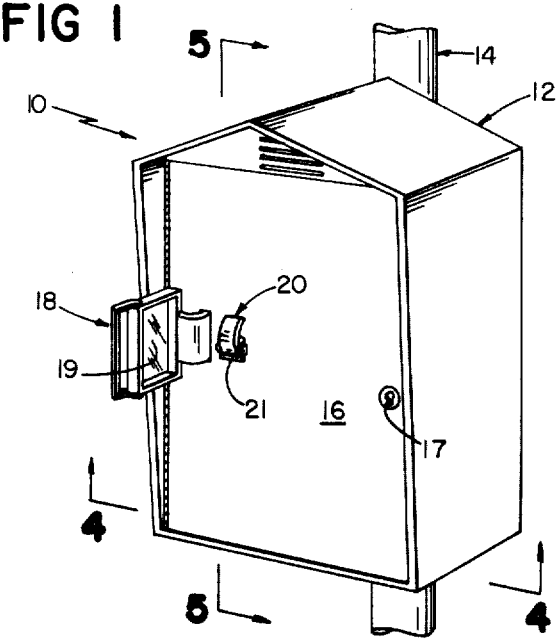
FIGS. 1 and 2 are perspective views of a self-contained alarm signal apparatus constructed according to the present invention.
Figure 2:
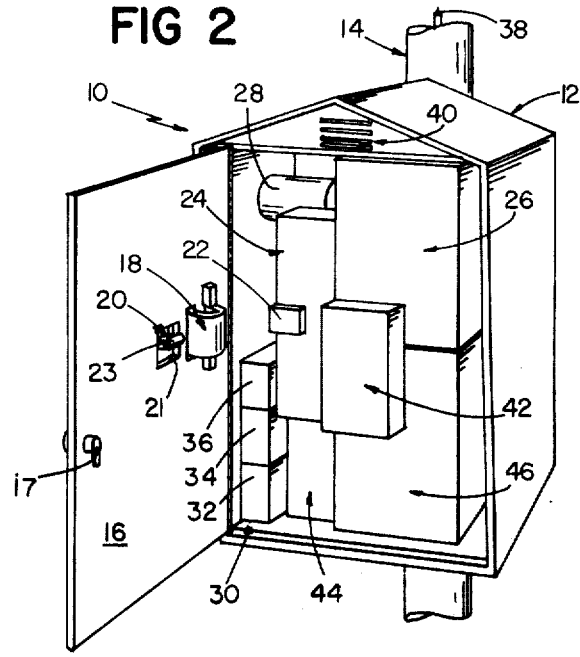

FIGS. 1 and 2 are perspective views of a remote, self-contained signal transmitter apparatus 10 in the form of a fire alarm box. The apparatus 10 comprises an enclosure 12 secured by a clamp 13 (see FIG. 4) to a supporting post 14 and having a door 16 mounted thereon. The door 16 includes a lock 17. A smaller second door 18, which includes a transparent panel 19, is mounted for swinging motion with respect to the door 16 and encloses a pivoted lever 20 which projects through an opening 21 in the door 16. As best seen in FIG. 2, a plate 22 mounted within the enclosure 12 is aligned with a roller 23 supported on the end of lever 20 which projects through the door 16.

The contents of the enclosure 12 are indicated very schematically in FIG. 2. The plate 22 projects from a connector mechanism 24 which, as described in detail below, for predetermined periods of time selectively interconnects a source of stored mechanical energy 26 with an electrical signal generator 28. The generator 28 is electrically connected to an electronics module 30 which comprises an encoder 32, a transmitter 34, and a receiver 36. An antenna 38 is connected to the transmitter 34 and may be supported in or on the post 14. An audible tone generator 40 is connected to the receiver 36 for the generation of an audible tone upon receipt by the receiver 36 of a predetermined coded signal. The plate 22 is secured to spring loaded movable plunger 41, the assembly forming a first input device to the connector mechanism 24.

Figure 5:
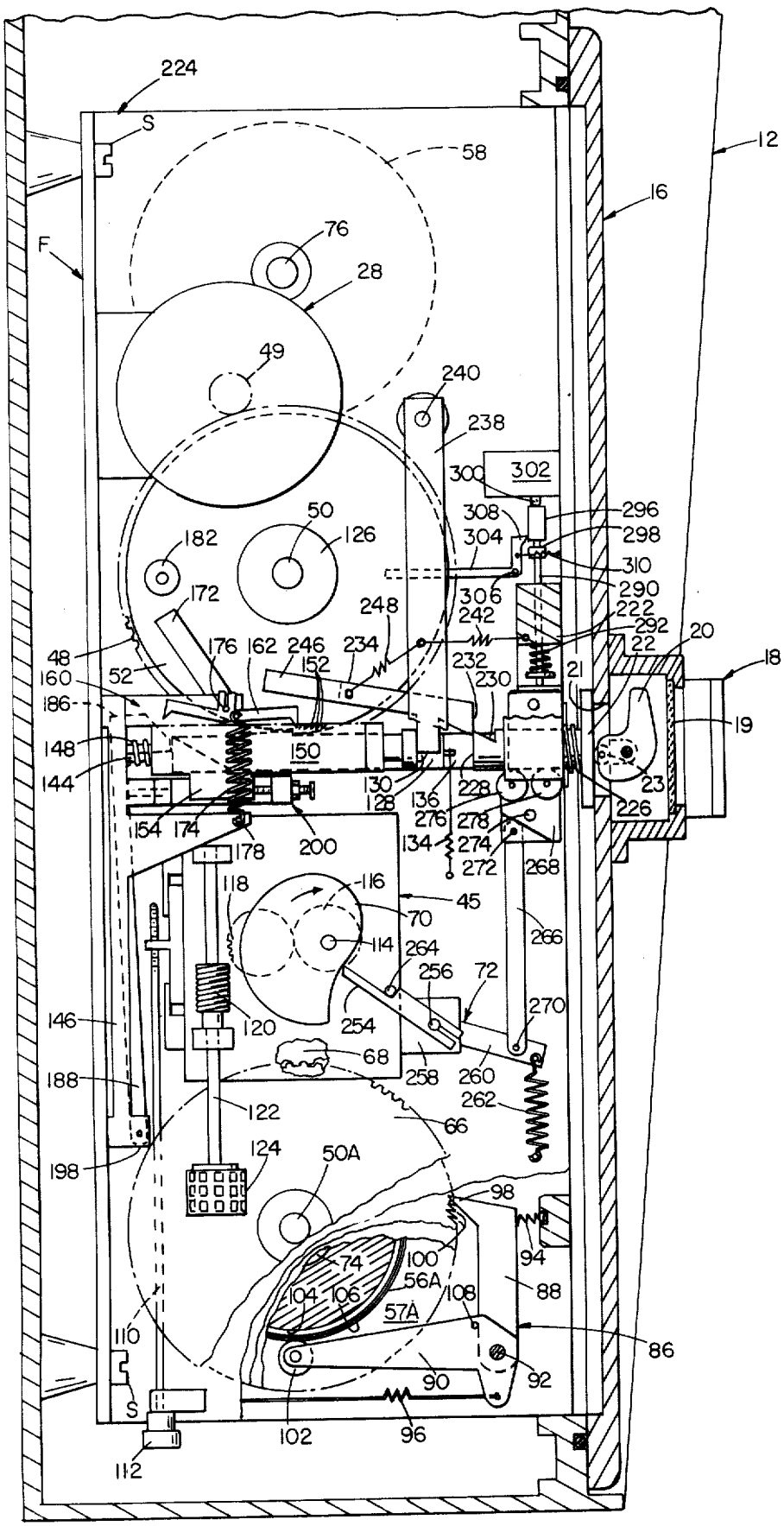
FIG. 5 is a view taken at 5—5 of FIG. 1.

A second input to the connector mechanism 24 is provided by a tilt sensing mechanism 42 in the form of a pendulum 43 which supports one end of a pivoted spring-loaded arm 43A which interacts with the connector mechanism 24. A clock unit 44 provides a third input to the connector mechanism 24. The unit 44 comprises a clock 45 driven by a second source of stored mechanical energy 46 and means (described below) for providing a mechanical input to the connector device 24 at one or more specific clock settings. As best seen in FIG. 5, all of the described elements are preferably mounted on a frame member F which is removably supported in the enclosure 12 by screws S.

Figure 3:
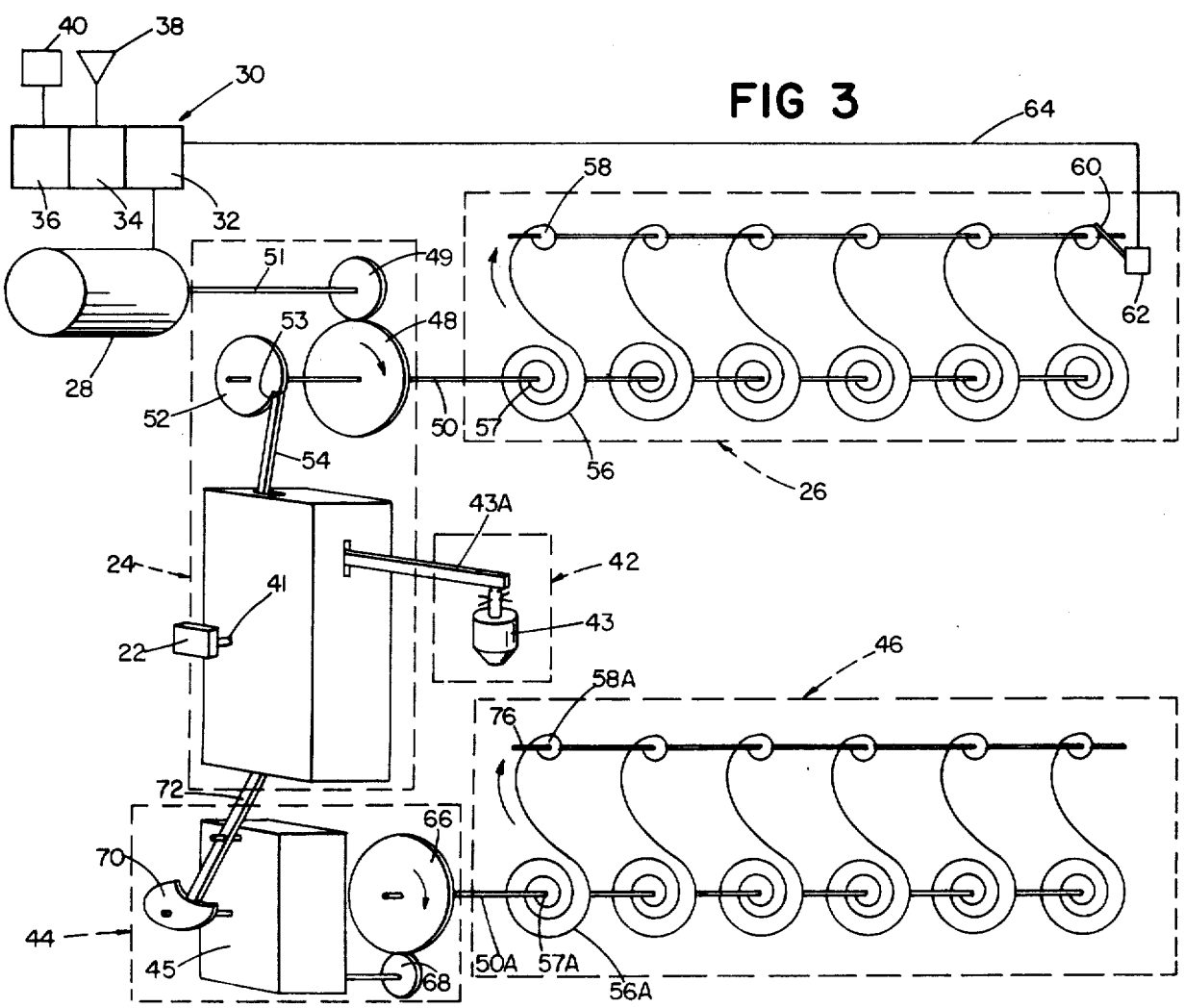
FIG. 3 is a schematic representation of the various portions of the apparatus of FIGS. 1 and 2.

The application of stored energy to the generator 28 by the connector device 24 can be described in a general way with reference to the schematic illustration of FIG. 3. A gear 48 is secured to a shaft 50 which projects from the source of mechanical energy 26. A second gear 49, secured to a shaft 51 which projects from the rotary portions of generator 28, is engaged with gear 48. The rotation of gear 48, and the consequent application of energy to the generator 28, is restrained by the provision of a disk 52 secured to shaft 50. The disk has a notch 53 on its peripheral edge. Check means are provided in the form of a catch arm 54 which is engageable with the notch 53 to restrain rotation of the disk 52 and hence the shaft 50.

As described in greater detail below, the source of mechanical energy 26 comprises a series (e.g., six) of spiral wound springs 56 which have opposite ends connected to spools 57 and 58. Each spool 57 is in turn connectable to shaft 50 for rotation therewith. A sensor 60 is provided which engages the last spring 56 of the series and which, upon exhaustion of the energy stored in that spring, as described in detail below, closes a micro-switch 62 which is interconnected by a lead 64 with the encoder 32.

The second source of mechanical energy 46 drives the clock 45 through gears 66 and 68. The construction of the source of mechanical energy 46 is identical to that of source 26 with the exception that a sensor 60 and microswitch 62 are not provided. The gear 66 is secured to shaft 50A and springs 56A are secured to spools 57A and 58A. The clock 45 may be of any conventional type and can be used to drive a cam 70. A cam follower unit 72 provides the mechanical input to the connector mechanism 24.

Energy Sources

Figure 4:
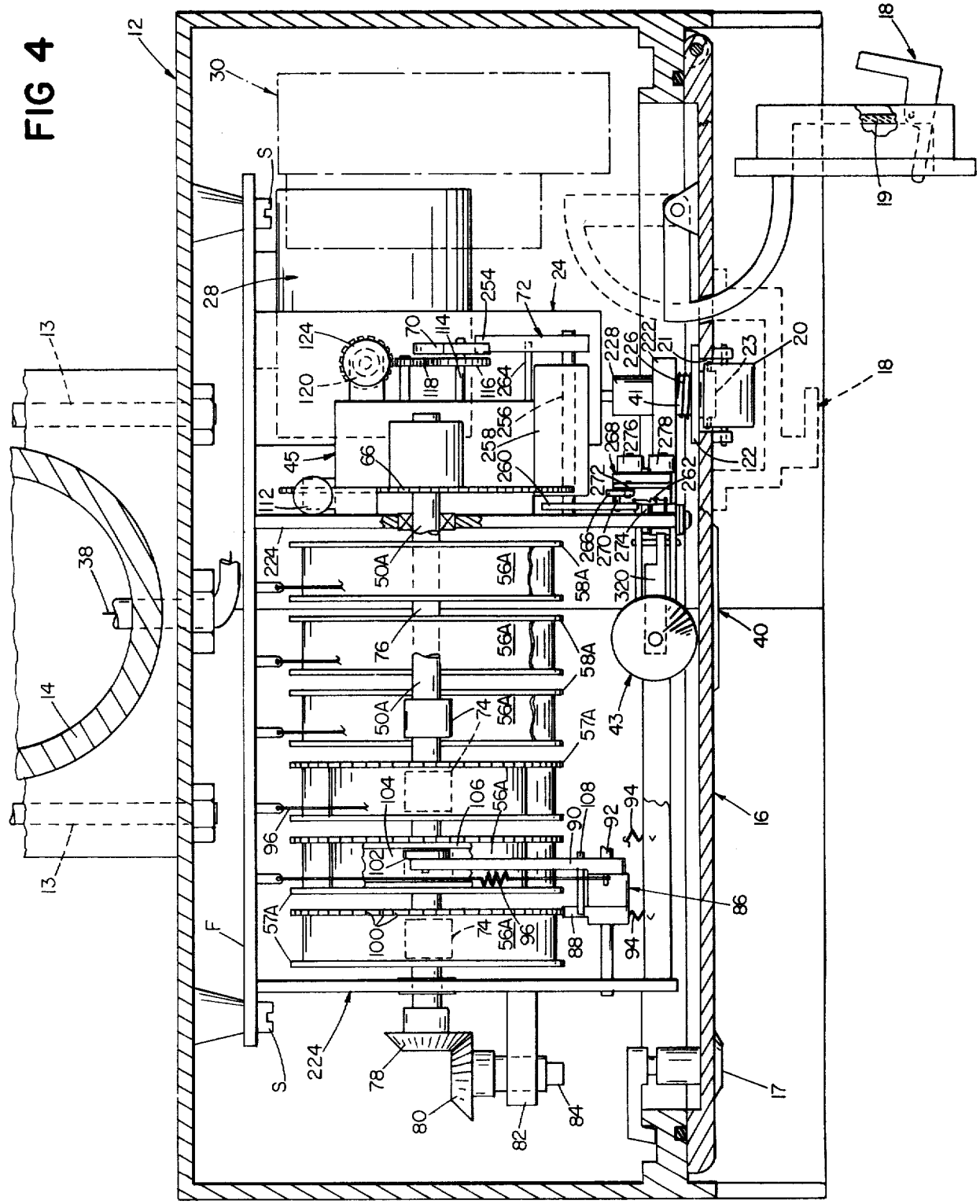
FIG. 4 is a view taken at 4—4 of FIG. 1.
Figure 7:
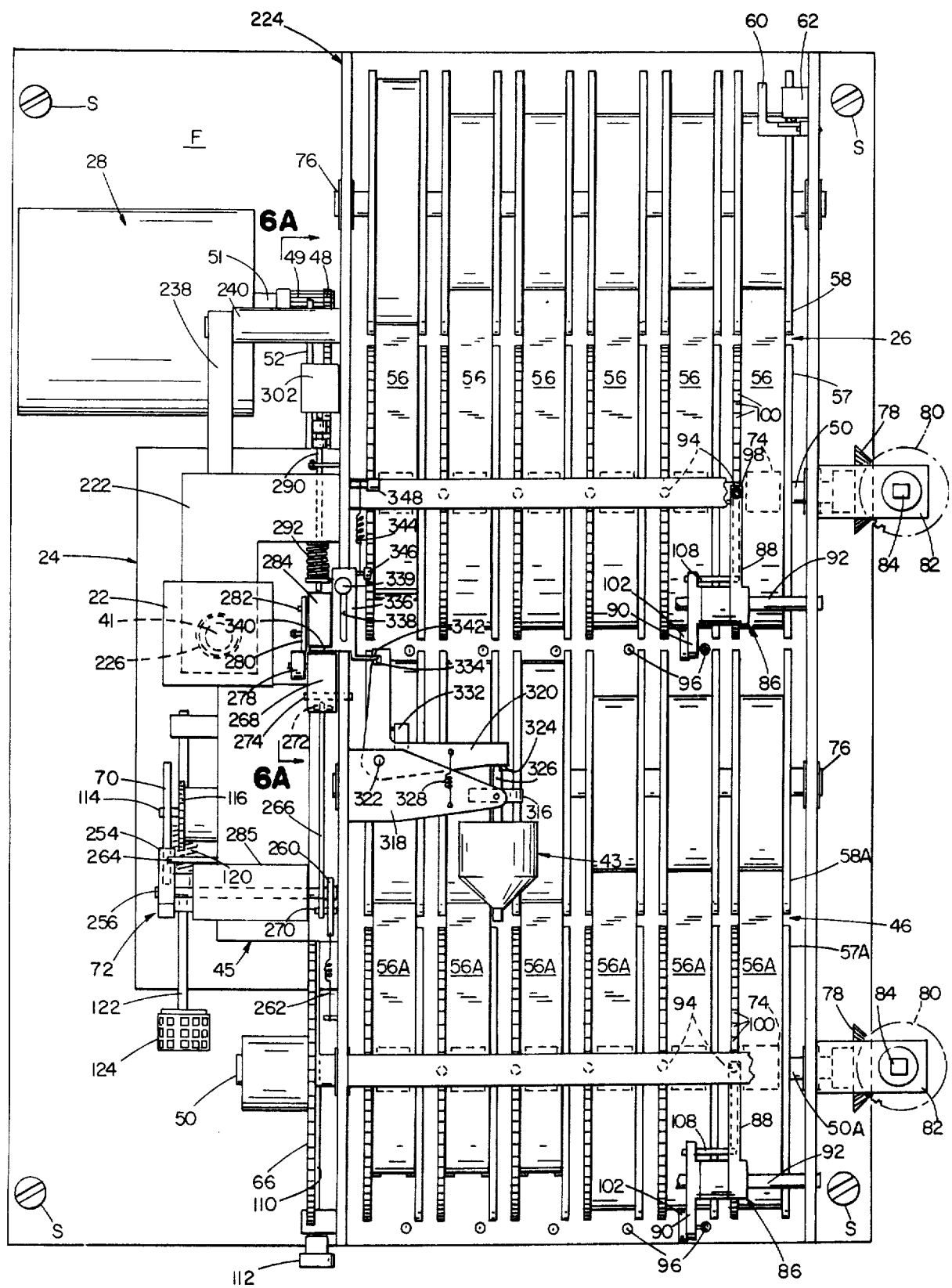
FIG. 7 is a view taken at 7—7 of FIG. 5.

The operation of the energy sources 26, 46 may be described with reference to FIGS. 4, 5, and 7. The construction and operation of each of the sources 26, 46 is identical. Referring first to FIG. 7, it will be seen that each source 26, 46 comprises six identical spring units each comprising a pair of vertically aligned spools 57, 57A and 58, 58A with a coil spring 56, 56A wrapped around one or both of the spools (depending upon whether the particular unit is fully stored with energy, partially depleted, or full depleted). The springs 56, 56A are formed, as is well known in the art, so as to be in a fully stressed condition when wound about the lower spool 57, 57A and to be fully depleted when wound about the upper spool 58, 58A. Each of the lower spools 57, 57A is connected to the shaft 50, 50A by means of a single direction clutch 74 which drivingly connects the spool 57, 57A with the shaft 50, 50A only in the direction (i.e., clockwise as viewed in FIG. 5) in which the spring 56, 56A tends to drive the spool 57, 57A. This permits the shaft 50, 50A to slip with respect to each of the lower spools 57, 57A other than the particular spool which at that moment is driving the shaft. The upper spools 58, 58A are supported on an idler shaft 76.

At the opposite end of each shaft 50, 50A from the gears 48, 66, a level gear 78 is secured to the shaft and is engaged with a second level gear 80 itself supported for rotation in a fixed support 82. A stud 84 is secured for rotation with the gear 80 and provides a means for rotating the respective shaft 50, 50A to store mechanical energy in each of the spring units of the respective source of energy 26, 46. The stud 84 can be shaped to receive any suitable manual or power driven tool.

An interlock device 86 is associated with each adjacent pair of spools 57 or 57A. Each interlock device 86 comprises first and second arms 88, 90, each pivotally mounted on a fixed shaft 92. As viewed in FIG. 5, each of these arms is biased toward an associated spool 57, 57A, the arm 88 being biased in a counter clockwise sense with respect to shaft 92 by spring 94 and the arm 90 being biased in a clockwise sense with respect to shaft 92 by spring 96. The springs are chosen such that the force exerted by spring 96 is sufficient to overcome the force exerted by 94. The arm 88 is provided with a portion 98 suitable for engaging one of a series of notches 100 provided in the periphery of the spool. The arm 90 includes a pivoted wheel 102 which engages the spring 56a wound on a spool 57, 57A and, when the spring is depleted, which drops into a slot 104 (see FIG. 5) provided in the hub 106 of the spool. A pin member 108 projects from arm 90 toward arm 88 and is disposed to engage arm 88 and rotate arm portion 98 away from notches 100 when the wheel 102 drops into slot 104. Thus, prior to the depletion of the energy stored in any given spring unit, the spool 57, 57A on the succeeding unit will be prevented from rotating by the engagement of arm portion 98 with one of the notches 100. As a given spring unit is depleted of energy, however, the roller 102 will drop into the slot 104 of that unit and thereby release the succeeding unit which will then become drivingly engaged with the shaft 50, 50A.

Since the source of energy 46 drives the clock 45 continuously at a known rate, the time period before a recharging of the source 46 is required (by means of the stud 84 as discussed above) is known. Since, as discussed further below, the energy stored in the source 26 is dependent upon the usage rate of the fire alarm box, it is more difficult to predict the usable lifetime of the source of energy 26. The sensor 60 and microswitch 62 are thus provided to sense the condition of the last spring unit of the source 26 and to close a circuit in the encoder 32 which will modify the transmitted signal when the energy stored in that last unit is low, thereby providing an indication to a central office that recharging of the source 26 is necessary.

Referring to FIGS. 5 and 7, the clock 45 is provided with a manual adjustment 110, having a lower gripping portion 112, by means of which the clock rate can be adjusted. The cam member 70 is secured to a shaft 114 which projects from the clock 45. A gear 116 (see FIGS. 4, 5, and 7) is also secured to shaft 114. An idler gear 118 is mounted on the exterior face of the clock 45 and is engaged with the gear 116. Worm gear 120 is secured to a vertically slidable shaft 122 and is rotatable by means of a handle portion 124. The setting of the clock 45 and the cam 70 may be manually adjusted by raising the worm gear 120 for engagement with gear 118 and then rotating the shaft 122 and worm gear 120.

Connector Mechanism

Figure 8:
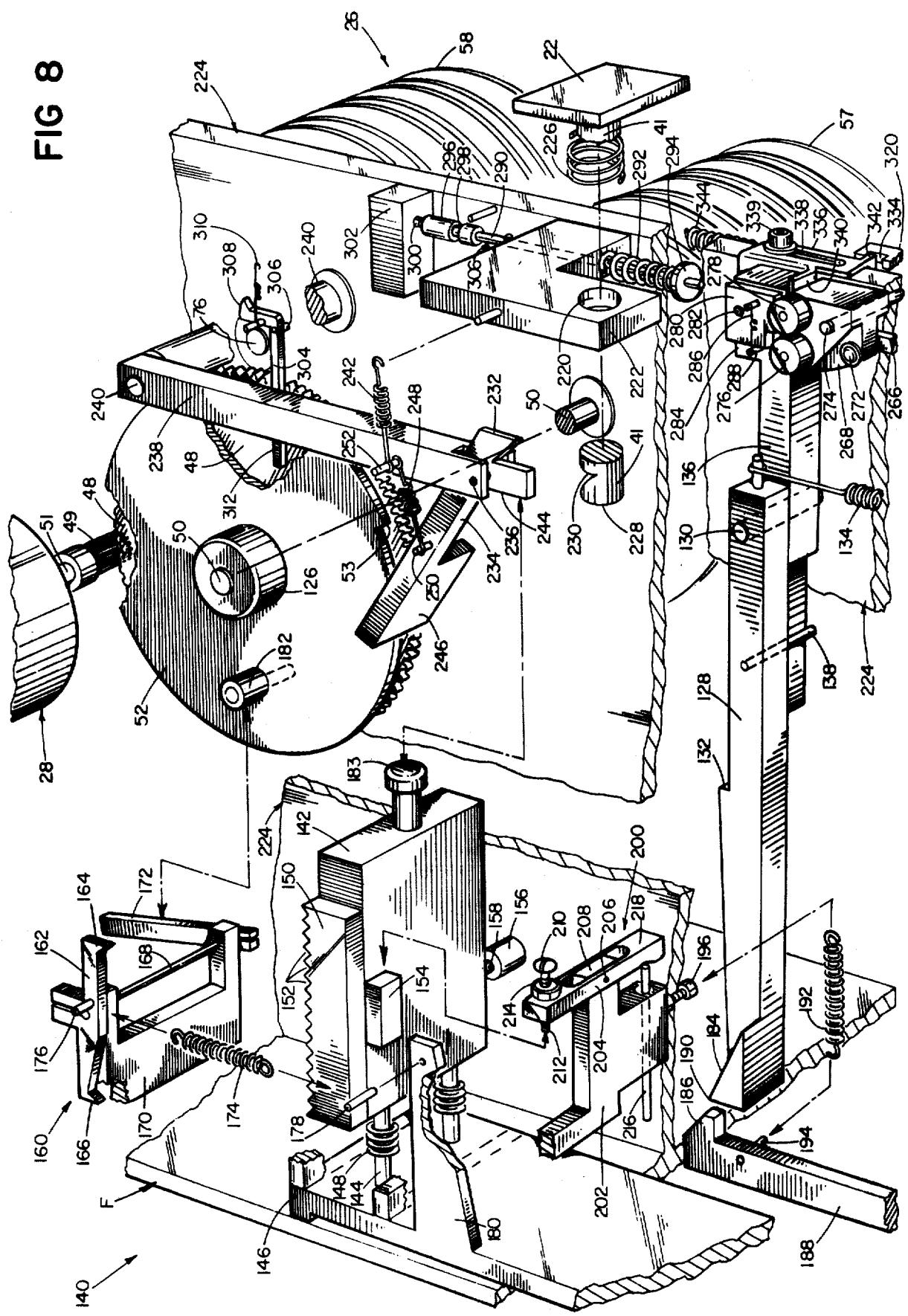
FIG. 8 is a partially broken away, partially exploded view of a portion of the apparatus illustrated in other figures, particularly FIG. 5.

The operation of the connector mechanism 24 has been generally described above in connection with the schematic illustration of FIG. 3. Reference to FIGS. 5 and 8 will provide a more detailed understanding of the operation of this mechanism. As discussed above, gear 48 and plate 52 are secured to shaft 50 for rotation therewith, the plate 52 actually being secured to the shaft through the slip clutch 126 for reasons which will become apparent below. The member (indicated schematically as 54 in FIG. 3) which engages the notch 53 on plate 52 to restrain rotation thereof is actually a check arm 128 pivoted at 130 and having a notch 132 for engaging the notch 53 in plate 52. The arm 128 is biased in a clockwise direction (i.e., biased for engagement of notches 132 and 53) as viewed in FIGS. 5 and 8 by means of spring 134. A trip arm 136 is mounted adjacent check arm 128 for pivotal motion about the pivot 130. A stud 138 projects from the side of check arm 128 and bears against the undersurface of trip arm 136, whereby the arms 128, 136 act independently in one sense of rotation and that as a rigid unit in the other sense of rotation.

The connector mechanism 24 may be described in greater detail with reference to FIG. 8. As previously discussed, the structure includes the notched plate 52 and associated gear 48 as well as check arm 128 and release arm 136. The gear ratio between gears 48 and 49 is chosen such that a single revolution of the gear 48 is sufficient to cause enough rotation of the rotary portions of generator 28 which will produce a signal, when properly encoded, to identify the particular box transmitting the signal. When the apparatus is employed as a fire alarm box, however, provision must be made to meet the standards for radio operated fire alarm boxes, which standards require that the signal be repeated three times upon a single manual tripping of the alarm mechanism. Since the check arm 128 is biased by spring 134 such that its notch 132 bears against the peripheral edge of the plate 52, after disengagement of the notches 132 and 53 a single rotation of the plate 52 is all that would be permitted, the notches reengaging after one revolution. Thus, an escapement mechanism 140 is provided to permit these rotations of plate 52 (and thus gear 48) when the input to the connector device 24 is from the manually operated lever 20 (i.e., the input which denotes an actual emergency).

The escapement mechanism 140 comprises a slide 142 supported on rods 144 which are secured to a structural member 146 which is fixed with respect to the enclosure 12. The rods 144 extend into mating openings (not shown) in the rear face of the slide 142. Springs 148 are disposed around the rods 144 between the member 146 and the slide 142 and bias the slide 142 in a forward direction (i.e., to the right as viewed in FIG. 8).

At one side thereof the slide 142 supports a rack 150 having upwardly facing teeth 152. A pusher block 154 is secured to the underside of slide 142 adjacent one lateral edge and intermediate the front and rear surfaces of the slide. A roller 156, pivotally supported on a shaft 158 which is rigidly secured to the slide 142 on the side opposite the rack 150, is provided intermediate the front and rear surfaces of the slide 142.

A unit 160 is mounted on member 146 above the slide 142 and includes a double pawl member 162 having oppositely facing pawls 164, 166 which are disposed for engagement with the teeth 152 on rack 150. The member 162 is secured to a rod 168 which is pivotally supported on a body portion 170 of the unit 160. An actuator arm 172 is secured to the opposite end of rod 168 for rotation therewith. A biasing spring 174 extends between a stud 176 on the member 162 and a second stud 178 which is secured to a forwardly projecting arm 180 of the member 146. The stud 176 is located on the member 162 forward of the rod 168 and thus the forward pawl 164 is biased downwardly and the rear pawl 166 is biased upwardly. In the final assembly of the apparatus, the actuator arm 172 is disposed such that a striker knob 182 which projects from the exposed surface of plate 52 will engage the arm 172 once during each rotation of the plate 52. This engagement will cause a small counter clockwise rotation of rod 168 followed by an immediate clockwise rotation after the knob 182 has passed the arm 172. There is thus produced a rocking action of the pawl member 162 for each rotation of the plate 52. This rocking action with respect to the rack 50 combined with the biasing action of the springs 148 produces a forward (i.e., rightward in FIG. 8) motion of the slide 142 by an amount equal to the spacing of teeth 152 for each rotation of the plate 52.

The way in which this step-wise forward motion of the slide 142 is limited to three increments (thus providing the desired three rotations of the plate 52 and gear 48) may now be described. In a manner further described below, the manual tripping of the alarm box causes pressure to be applied to a post 183 which projects from the front face of slide 142. This pressure causes the slide to move rearward thus compressing the springs 148 and causing the front pawl 164 to rachet over the teeth 152 on rack 150. Additionally, the roller 156 engages in inclined surface 184 provided on a lateral projection at the rear of check arm 128. The result is that the arm 128 is pivoted in a counter clockwise direction about the pivot point 130, thus disengaging the notch 132 from notch 53 on plate 52 and also permitting the hook portion 186 of an arm 188 to slip over the upper rearward edge 190 of the surface 184 under the influence of spring 192 which biases the arm 188 in a forward direction. The spring 192 extends between a stud 194 secured to the arm 188 and a screw 196 which is fixed with respect to the member 146. The arm 188 is vertically disposed and is pivotally supported on a member 198 (see FIG. 5) which is integral with the member 146. The engagement of the hook 186 with the arm 128 thus maintains the notch 132 in a retracted position and prevents reengagement with a notch 53.

The release of the arm 128 after three increments in the forward motion of slide 142 is accomplished by means of a unit 200 mounted below the slide 142. The unit 200 comprises a body portion 202 which is secured to the member 146 and a rocker 204 pivotally mounted at 206 to a forward projecting arm 208 of the body 202. A screw 210 is threaded through a mating opening in one end of the rocker 204 and its exposed rearward facing end 212 is aligned so as to be engageable by the block 154 on the underside of slide 142. The front-to-back position of the end 212 is adjustable by simply turning the screw 210. The desired position is maintained by a set nut 214. A rod 216 is slidably mounted in the body 202 in an opening thereof aligned with the opposite end 218 of rocker 204. In the assembled apparatus, the rod 216 is aligned with the arm 188. Thus, in the forward incremental motion of slide 142 the pusher block 154 will engage the screw 210 on rocker 204 and, with each increment in the motion of slide 142, cause the opposite end 218 of the rocker to push the rod 216 toward the rear of the apparatus (i.e., to the left in FIG. 8) in increments which are simultaneous with the incremental motions of the slide. As will be evident, by the proper positioning of the pusher block 154, the setting of the screw 210, and the length of the rod 216, the apparatus may be adjusted to provide for the disengagement of the hook 186 from the arm 128 after three forward increments in the motion of slide 142 or, equivalently, the simultaneous three rearward increments in the motion of rod 216. Upon its release, of course, arm 128 is rotated in a clockwise direction about pivot 130 under the influence of spring 134 and the notch 132 is thus located for reengagement with the notch 53 on disk 52.

Input Devices

The first input device providing a mechanical input to the connector mechanism 24 comprises the previously described plate 22 and the plunger 41 to which it is secured. The remainder of this input may be described with respect to FIGS. 5 and 8. Plunger 41 is supported for sliding motion in a suitably sized opening 220 provided in a downwardly projecting portion of a member 222 which is rigidly secured to a structural support 224 integral with frame F. A spring 226 is disposed around the plunger 41 between the plate 22 and the member 222 for biasing the plate in a forward direction (i.e., to the right in FIGS. 5 and 8). The end of plunger 41 remote from the plate 22 has a generally flat bearing surface 228 and an upwardly facing notch 230 cut into the surface of the plunger. The end 228 bears against a front facing end 232 of an arm 234 pivotally mounted at 236 to a support arm 238. The support arm 238 is itself mounted on a pivot 240 secured to the support member 224 and is biased by spring 242 in a counter clockwise direction as viewed in FIGS. 5 and 8. The arm 234 includes a surface 244 which engages the post 183 projecting from slide 142. The arm 234 is extended toward the rear of the apparatus (i.e., to the left as viewed in FIGS. 5 and 8) to provide a portion 246 disposed to be engaged by the striker knob 182 on plate 52. The arm 234 is biased in a clockwise direction (as viewed in FIG. 8) about pivot 236 by means of spring 248 disposed between studs 250, 252 secured, respectively, to the arm 234 and the support arm 238.

The operation of this first input device may now be described. The person wishing to use the alarm box opens the door 18 and pulls outwardly and downwardly on the pivoted lever 20 thereby causing the roller 23 to push the plate 22 toward the rear of the apparatus (i.e., toward the left as viewed in FIGS. 5 and 8). The surface 228 of plunger 41 transmits this force to the arm 234 via the surface 232. The surface 244 of that arm pushes against the post 183 on the slide 142. The resultant rearward motion of these elements causes the support arm 238 to rotate in the clockwise direction about pivot 240 against the influence of spring 242.

Meanwhile, the roller 156 has begun to engage the surface 184 of check arm 128 with a consequent disengagement of notch 132 on that arm from the notch 53 on the plate 52. The plate 52 is thus freed to rotate under the influence of the source of stored mechanical energy 26 acting on the shaft 50. After a portion of a complete revolution, the knob 182 strikes the portion 246 of arm 234 and thus rotates the arm 234 in a counter clockwise direction with respect to pivot 236 against the influence of spring 248. This rotation of arm 234 raises the surface 232 above the mating surface 228 on plunger 41 and, under the influence of spring 242, the entire assembly comprising arms 234 and 248 snaps back in a counter clockwise direction about the pivot 240 until the surface 232 engages the vertical surface of notch 230 in plunger 41. By this time, however, the slide 142 has been pushed to its extreme rearward position and the stepwise forward motion of the slide is underway. The release of surface 232 from surface 228 is provided to prevent jamming of the apparatus should the person operating the apparatus apply continuous force to the pivoted lever arm 20 rather than, as is desirable, simply pull it once and then let go. Without the provision of arms 234 and 238, the direct application of force from the plunger 41 to the slide 142 would prevent the stepwise forward motion of the slide if the arm 20 were not released. When the surface 232 jumps forward from the surface 228 to the notched 230 of plunger 41, however, the surface 244 of arm 234 is also moved sufficiently forward to permit the full three-increment forward motion of slide 142 before the post 183 reengages the surface 244. Upon release of the lever 20, the spring 226 returns the plunger to its initial position with its surface 228 in contact with surface 232 of arm 234, as seen in FIG. 5.

Another mechanical input to the connector mechanism 24 is periodically and automatically provided by the timer unit 44. As will be seen, this mechanical input occurs once for each rotation of the cam member 70. The cam member 70, of course, may be geared to be driven by the clock 45 such that a full rotation of the cam member will occur in any desired period of time. Typically, it will be desired to automatically test the operation of the fire alarm box once each day, so that the cam member 70 will be driven so as to complete a single revolution in 24 hours.

In FIG. 3 the mechanical input to the connector mechanism 24 from the automatic self-test input 44 was represented by the member 72. The actual preferred linkage by means of which this input is provided may be described with reference to FIGS. 5, 6A-C. A cam follower 254 rides the edge of the cam member 70 and is secured for rotation with a rod 256 supported for rotation in a structural member 258. An arm 260 is secured to the other end of rod 256 for rotation therewith and has its free end biased in a downward direction (i.e., clockwise as viewed in FIG. 5) by means of spring 262. The spring 262 thus biases the cam follower 254 in a direction generally toward the edge of the cam member 70. A stop 264 defines the maximum rotation of cam follower 254 under the influence of spring 262 and assures that the cam follower will not slip past the cam member 70, as might be possible in certain rotational orientations of the cam member.

With the cam member 70 beginning in an orientation as shown in FIG. 5 and rotating in a clockwise direction, it will be seen that the cam member will act over a period of twenty-four hours, to cause a slow progressive rotation of the follower 254 in a counter clockwise sense. This causes a similar rotation of the arm 260 against the influence of the spring 262. This upward force is transmitted via link 266 to a trip block 268, the link 266 being pivotedly connected to both the arm 260 and the trip block 268 as indicated at 270, 272. The trip block 268 is supported on a portion of the apparatus frame for rotation about pivot pin 274. Cocking roller 276 and trip roller 278 are pivotedly supported on the block 268 adjacent the upper edge thereof.

Figure 6A:
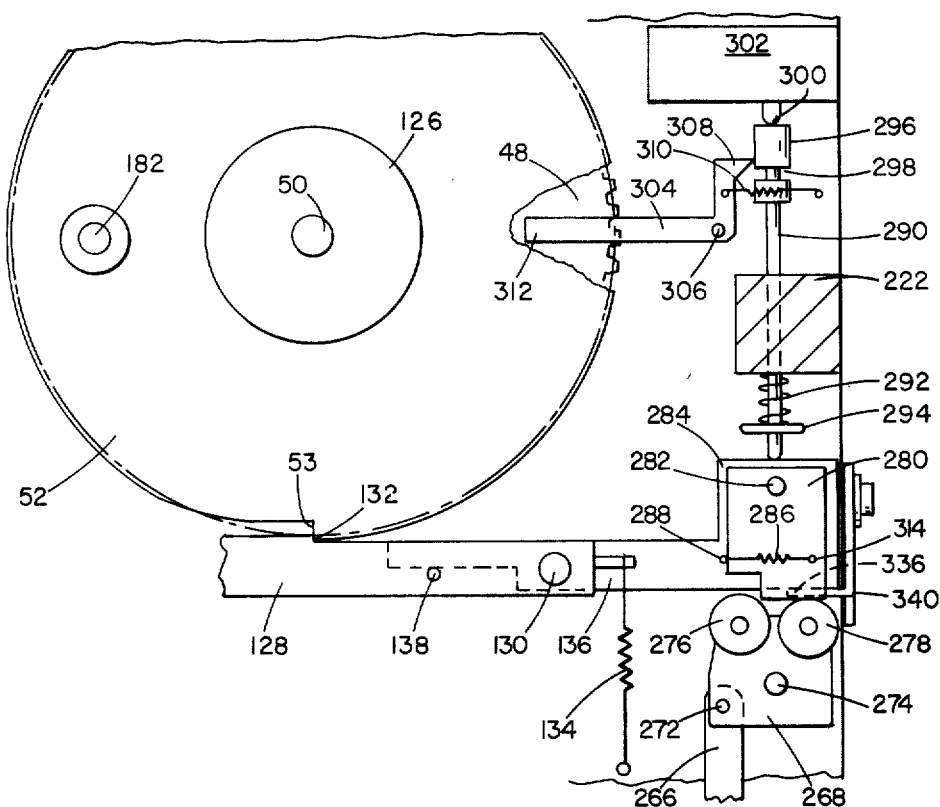
FIG. 6A is a view taken at 6A—6A of FIG. 7.
Figures 6B, 6C:
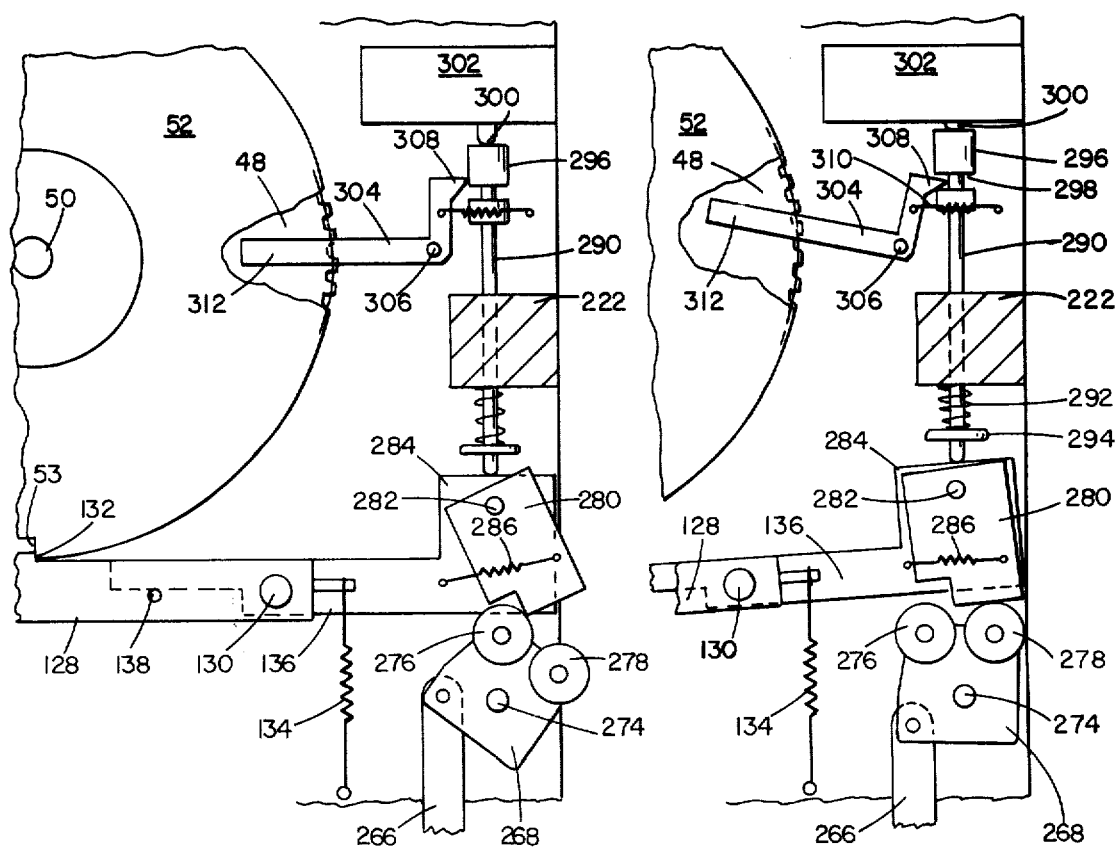
FIG. 6B and 6C are views similar to that of FIG. 6A showing further stages in the operation of the portion of the apparatus therein illustrated.

The description of this mechanical input to the connector mechanism 24 may be best described with reference now to FIG. 6A, which is a vertical view similar to the side elevation of FIG. 5 but taken at a location to reveal the details of the portions of the apparatus now under consideration (see FIG. 7). A trip plate 280 is disposed immediately above the rollers 276, 278 and is pivotedly supported as at 282 to an upward projection 284 of trip arm 136 at the forward end thereof. A spring 286 is disposed between the trip plate 280 and the arm 236 and biases the trip plate in a clockwise direction as seen in FIG. 6A. The pin 288 on arm 136 to which the spring 286 is secured also serves as a stop defining the rest position of the trip plate 280. A plunger 290 is disposed above the portion 284 of trip arm 236 with its lower end resting thereupon and is biased in a downward direction by spring 292 which acts against bearing plate 294 secured to the plunger. The upper end of the plunger includes a tip portion 296 of greater diameter and having a reduced diameter detent 298 intermediate its ends. The actuator button 300 of a microswitch 302 is aligned with the upper end of the tip 296. A catch member 304 is pivotally mounted on a pin 306 which projects from structural member 224 and includes a hook portion 308 biased towards the tip 296 on plunger 290 by means of spring 310. A leg 312 of the catch member 304 projects between the plate 52 and gear 48 which have been previously described.

The detailed operation of this mechanical input to the connector mechanism and the reaction of the connector mechanism thereto may be described with reference to FIGS. 5, 6A-C. As the cam member 70 rotates in a clockwise sense from the orientation indicated in FIG. 5, the follower 254 will be forced downward away from the stop 264 with the consequent upward motion of the link 266, as described above. This upward motion of the link 266 causes the trip block 268 to rotate in a clockwise sense about the pivot 274. As this rotation slowly proceeds, the wheel 276 will engage the vertical surface 314 provided by a notch in the lower inner corner of the trip plate 280. The plate 280 will thus slowly swing to the right, as indicated in FIG. 6A, pivoting about the point 282 against the influence of biasing spring 286. The rotation of the cam member 70 to an orientation which is almost a full revolution from that illustrated in FIG. 5, with the follower 254 in contact with the cam edge portion which is radially most distant from the shaft 114, will result in a rotation of the trip block 268 to the orientation shown in FIG. 6B where the cocking roller 276 is lodged in the notch provided in the lower corner of trip plate 280. When the continued rotation of the cam member 70 causes the follower 254 to pass the sharp corner in the edge of the cam member and drop back to the position shown in FIG. 5, the trip block 268 will be suddenly rotated from the orientation shown in FIG. 6B to the original orientation shown in FIG. 6A. In this rotation, the trip roller 278 will contact the lower edge of trip plate 280 (FIG. 6C) and, as that roller swings upwardly in its arc about the pivot point 274, it will push the trip plate 280 upwardly. This upward movement will be transferred to the end portion 284 of trip arm 136 by the pin 282. Thus, the trip arm 136 will swing in a counter clockwise direction as seen in FIG. 6A through a small angle and, bearing against the pin 138 secured to the arm 128 will cause that arm to undergo a similar rotation thereby disengaging the notch 132 from the notch 53 on the plate 52 and releasing the plate, and the gear 48, for rotation under the influence of the source of stored mechanical energy 26. This action of the block 268, plate 280, and arms 136, 128 is substantially instantaneous so that almost immediately after the release of the plate 52 the arm 128 is swung back to its original position under the influence of the spring 134. The notch 132 is thus in position to reengage the notch 53 after a single rotation of the plate 52.

The slight upward motion of the end portion 284 of trip arm 136 causes the similar upward motion of plunger 290 against the resistance of spring 292 and the consequent depression of button 300 on microswitch 302 by the tip portion 296 of the plunger. The microswitch 302 is connected in conventional fashion to the encoder 32 to cause an alteration in the encoded signal, whereby it may be realized by the receiver of the signal that an automatic, self-test signal has been transmitted rather than a manually produced, fire-indicating signal. The catch arm 304, being biased toward the tip 296, engages the detent 298 thereby maintaining the button 300 of microswitch 302 in a depressed condition. This is required to assure that the microswitch is effective to produce the encoding change desired. The projecting arm 312 of the catch member 304 is struck, after a portion of a revolution of the plate 52, by a stud projecting from that plate between the plate and the gear 48. This stud, which may be integral with knob 182, causes the momentary, slight retraction of the latch portion 308 from the detent of 298 and allows the plunger 290 to return to its initial position.

The final input device which is linked to the connector mechanism 24 comprises the tilt sensing mechanism 42 (see FIGS. 2 and 3). This mechanism was illustrated in a simplified, somewhat schematic form in FIG. 3 but may be described in detail with respect to FIG. 7. Referring to FIG. 7, the pendulum 43 is suspended from a gimbal 316 itself supported by a support 318 which projects laterally from a main support 224. An L-shaped arm 320 is pivotedly mounted on the support 318 at 322 and has the undersurface 324 of its horizontal leg in contact with the upper surface of the pendulum shaft 326. The member 320 is biased in a clockwise sense by spring 328 which extends between the horizontal arm of that member and the support 318. A microswitch 332 is secured adjacent the member 320 to open or close a circuit depending upon the orientation of member 320, as further described below. A notch 334 is provided in the vertical leg of the member 320 near the upper end thereof.

A slide 336 is mounted for sliding motion with respect to the support 224 and includes a vertically disposed slot 338 through which a screw 339 projects. The slot and screw serve as a guide for the vertical motion of the slide 336. The slide 336 includes tang 342 which is engagable with the notch 334 on the member 320. On the opposite side of the main support 224, another tang 340 of the slide 336 engages the end portion 284 of the trip arm 136. A biasing spring 344 extends between a screw 346 on the slide 336 and a screw 348 secured to the support 224 and biases the slide 336 upwardly.

In the operation of the tilt-sensing mechanism, if the apparatus 10 or the post 14 upon which it is supported should be tilted substantially with respect to the vertical (e.g., as by vandalism, the striking of the post by a motor vehicle, etc.) the pendulum 43 will remain at a true vertical causing the shaft 326 to disengage from the surface 324 of the member 320. When this occurs the spring 328 causes the rotation of the member 320 and the consequent release of the tang 342 of slide 336. This, of course, causes the slide 336 to move upwardly under the influence of spring 344. The tang 340 causes consequent upward motion of the end portion 284 of the trip arm 136 with the attendant release of plate 52 and gear 48 in a manner as previously described with respect to the input from the automatic, self-test input device. The upward motion of the plunger 290 and the catch member 304, as previously described is also produced.

There is no provision for the return of the slide 336 to its original position and, therefore, the notch 132 does not reengage the notch 53 on plate 52. The result is a continuous generation and transmission of an encoded signal when the tilt-sensing mechanism is activated. The continuous nature of this signal, as well as the input to the encoder from the microswitch 332 distinguishes, at the receiving station, the automatic, self-test mode of operation from the tilt indicating mode. The rapid loss of stored energy in the source 26 in this mode of operation is not a matter of concern since the immediate dispatching of a repair crew to the scene of the damaged box is required in any case. If the apparatus itself were undamaged, the tilt sensing mechanism can be reset manually to the condition shown in FIG. 7 after the post 14 has been repaired or replaced and the sources of energy replenished using the gears 78, 80 as discussed above.

While a particular preferred embodiment of the invention has been illustrated in that accompanying drawing and described in detail herein, other embodiments are within the scope of the invention and the following claims.

I claim:

1. A self-contained alarm signal apparatus comprising
    an electrical signal generator,
    a transmitter connected to receive the output of said generator,
    a first source of mechanical energy, including first spring means and manual winding means therefor,
    a second source of mechanical energy, including second spring means and manual winding means therefor
    connector means for intermittently applying energy from said first and second sources of mechanical energy to said generator for the production of an electrical signal, and
    first and second input devices for delivering mechanical inputs from said first and second sources of mechanical energy to said connector means, each said mechanical input device being operative to cause said connector means to apply mechanical energy to said generator,
    said first input device being connected to said first source of mechanical energy, and
    said second input device being automatically operable and being connected to said second source of mechanical energy and including a timer and means responsive to said timer to deliver a mechanical input from said second spring means to said connector means at predetermined time intervals.

2. A self-contained alarm signal apparatus comprising
    an electrical signal generator,
    a transmitter connected to receive the output of said generator,
    a first source of mechanical energy including a plurality of spring units connected to serially drive a common shaft, each spring unit comprising a first spool securable to said shaft having a common axis therewith, a second spool, and a coil spring secured at its opposite ends to said first and second spools,
    connector means for intermittently applying energy from said energy source to said generator for the production of an electrical signal,
    first and second input devices for delivering mechanical inputs to said connector means, each said mechanical input device being operative to cause said connector means to apply said energy to said generator,
    said first input device comprising manually actuable means,
    said second input device being automatically operable and comprising a timer, a second source of mechanical energy for driving said timer, said second source comprising a plurality of spring units connected to serially drive a common shaft, each spring unit comprising a first spool securable to said shaft having a common axis therewith, a second spool, and a coil spring secured at its opposite ends to said first and second spools and means to deliver a mechanical input to said connector means at predetermined time intervals.

3. A self-contained alarm signal apparatus comprising
    an electrical signal generator,
    a transmitter connected to receive the output of said generator,
    a source of mechanical energy including a plurality of spring units connected to serially drive a common shaft, each spring unit comprising a first spool securable to said shaft having a common axis therewith, a second spool, and a coil spring secured at its opposite ends to said first and second spools and an interlock device associated with each pair of adjacent spring units, each interlock device comprising first means movable between a first position in which it restrains rotation of said first spool of one of said pair of spring units and a second position in which it releases that first spool and second means responsive to a depletion of said coil spring on the first spool of the second spring unit of said pair to cause said first means to move from said first position to said second position,
    connector means for intermittently applying energy from said energy source to said generator for the production of an electrical signal,
    first and second input devices for delivering mechanical inputs to said connector means, each said mechanical input device being operative to cause said connector means to apply said energy to said generator, said first input device comprising manually actuable means, said second input device being automatically operable and comprising a timer and means to deliver a mechanical input to said connector means at predetermined time intervals.

4. The apparatus of claim 3 wherein said first spool of said second spring unit includes a notch in its rim, said first means comprising a first arm pivotally supported on a rod which extends parallel to said shaft and including a portion disposed for engagement with said notch when in said first position, said arm biased toward said first position, said second means comprising a second arm pivotally supported on said rod and including a follower in contact with said second spring, means biasing said second arm to maintain said contact, and a member disposed to engage said first arm and to move it from said first position to said second position when said follower reaches a predetermined distance from said shaft.

5. A self-contained alarm signal apparatus comprising an electrical signal generator, a transmitter connected to receive the output of said generator, a source of mechanical energy including a plurality of spring units connected to serially drive a common shaft, each spring unit comprising a first spool securable to said shaft having a common axis therewith, a second spool, and a coil spring secured at its opposite ends to said first and second spools, connector means for intermittently applying energy from said energy source to said generator for the production of an electrical signal, means to indicate when a substantial portion of the energy capacity of said source has been expended, first and second input devices for delivering mechanical inputs to said connector means, each said mechanical input device being operative to cause said connector means to apply said energy to said generator, said first input device comprising manually actuable means, said second input device being automatically operable and comprising a timer and means to deliver a mechanical input to said connector means at predetermined time intervals.

6. A self-contained alarm signal apparatus comprising an electrical signal generator, a transmitter connected to receive the output of said generator, a source of mechanical energy including a plurality of spring units connected to serially drive a common shaft, each spring unit comprising a first spool securable to said shaft having a common axis therewith, a second spool, and a coil spring secured at its opposite ends to said first and second spools, connector means for intermittently applying energy from said energy source to said generator for the production of an electrical signal, said connector means including a rotary unit secured to said shaft for rotation therewith and drivingly engaged with said generator, said rotary unit comprising a generally circular plate having a notch in its peripheral edge, check means movable between first and second positions, said check means in said first position preventing rotation of said rotary unit and in said second position permitting rotation of said rotary unit, said check means comprising a pivotally mounted check arm including structure for engaging said notch when said check means is in said first position, biasing means for biasing said check arm toward said first position, and release means responsive to each of said mechanical inputs for moving said check means from said first position to said second position, said release means comprising a trip arm movable, in response to said mechanical inputs of said second input device, between a first position in which it does not affect said check arm and a second position in which it engages said check arm to move said check arm to the check arm second position against the influence of said biasing means, first and second input devices for delivering mechanical inputs to said connector means, each said mechanical input device being operative to cause said connector means to apply said energy to said generator, said first input device comprising manually actuable means, said second input device being automatically operable and comprising a timer and means to deliver a mechanical input to said connector means at predetermined time intervals.

7. The apparatus of claim 6 wherein said first input device comprises a plunger slidable in a support, biasing means which bias said plunger toward a first position, actuator means for sliding said plunger to a second position, said actuator means accessible from the exterior of said apparatus for manual operation;

said connector means further comprising means aligned with said plunger for movement therewith and including a member disposed, to engage, during said movement, said check arm and to move said check arm from said first to said second position.

8. The apparatus of claim 7 wherein said means aligned with said plunger comprises a slide, slide biasing means which bias said slide toward said plunger.

9. The apparatus of claim 8 wherein said member comprises a roller secured to said slide, said check arm including a cam surface disposed to be engaged by said roller during the movement of said slide.

10. The apparatus of claim 8 wherein said connector means further include control means responsive to the movement of said plunger to maintain said check arm in said second position for a plurality of revolutions of said rotary unit.

11. The apparatus of claim 10 wherein said control means comprise latch means for latching said check arm in said second position, means responsive to the return movement of said slide under the influence of said slide biasing means to disengage said latch means from said check arm after a predetermined travel of said slide in said return movement, and escapement means responsive to the rotation of said rotary unit for causing said return movement to occur in a stepwise manner.

12. A mechanically powered, self contained radio signalling apparatus comprising
radio transmitter means
an electromechanical generator connected to said transmitter means for energizing it
manually operable means for selectively operating said generator to energize said transmitter means including first mechanical power means including first spring means and manual spring winding means therefor and
timer operable means for operating said generator to energize said transmitter means including second mechanical power means including second spring means and manual spring winding means therefor and timer means connected to said second mechanical power means for periodically automatically operating said generator to energize said transmitter means.

13. The signalling apparatus of claim 12 wherein said transmitter means has a plurality of transmitting modes, said manually operable means causing the energizing of said transmitter means in one of said modes and said timer operable means causing the energizing of said transmitter means in another of said modes.

* * * * *